United States Patent [19]

Modrey

[11] 4,140,040
[45] Feb. 20, 1979

[54] FASTENING DEVICE FOR LOCKING AN INSERT IN A HOLE OF A SUPPORT MEMBER

[76] Inventor: Henry J. Modrey, 3546 S. Ocean Blvd., Palm Beach, Fla. 33480

[21] Appl. No.: 811,684

[22] Filed: Jun. 30, 1977

[51] Int. Cl.$^2$ ............................................. F16B 13/06
[52] U.S. Cl. .......................................... 85/74; 85/79; 138/89; 220/327
[58] Field of Search ................... 85/74, 75, 73, 76, 79, 85/64, 65, 8.8, 70, 1 JP; 151/41.74, 41.7, 7; 220/327; 138/89; 292/DIG. 11

[56] References Cited

U.S. PATENT DOCUMENTS

| | | | |
|---|---|---|---|
| 1,265,866 | 5/1918 | Ackerman | 85/77 X |
| 2,568,518 | 9/1951 | Smith | 220/327 |
| 2,850,064 | 9/1958 | Rapata | 151/7 |
| 3,353,565 | 11/1967 | Markham | 138/89 |
| 3,365,998 | 1/1968 | Zahodiakin | 85/70 |
| 3,373,648 | 3/1968 | Pitzer | 85/74 X |
| 3,389,923 | 6/1968 | Love et al. | 85/8.8 |
| 3,443,473 | 5/1969 | Tritt | 85/70 |
| 3,469,493 | 9/1969 | Fisher | 85/72 |
| 3,503,431 | 3/1970 | Villo et al. | 85/8.8 |
| 3,523,482 | 8/1970 | Ploch | 85/79 X |
| 3,967,525 | 7/1976 | Lerich | 85/79 |

FOREIGN PATENT DOCUMENTS

| | | | |
|---|---|---|---|
| 258534 | 11/1967 | Austria | 85/65 |
| 209559 | 12/1966 | Sweden | 85/79 |

*Primary Examiner*—Ramon S. Britts
*Attorney, Agent, or Firm*—Hane, Roberts, Spiecens & Cohen

[57] ABSTRACT

A device for locking an insert in a support having a receiving hole or sealing a tubular member such as a pipe, consists of a somewhat bottle-shaped bushing having a cylindrical collar or bushing portion, and a conical portion secured at its narrow end to said collar, an inside screw thread, and a locking ring seated on the cone adjacent to the collar. The dimensions of the collar section of the bushing, the cone and the locking ring are so correlated that bushing and locking ring fit the cross-section of the hole with slight friction when the insert is placed in the hole. Locking of the insert in the hole is effected by inserting a screw bolt or screw tightening means into the insert coaxial therewith. This causes lifting of the insert which in turn effects spreading of the locking ring thereby pressing the same against the wall of the hole. The depth to which the insert is inserted into its hole provides means for accurately regulating the degree of force applied by the expanding insert on the surrounding hole wall.

27 Claims, 13 Drawing Figures

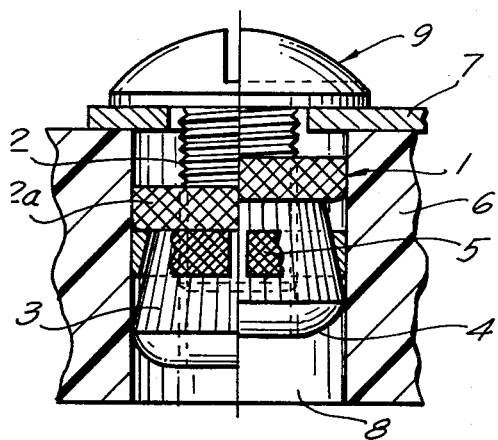
FIG. 1
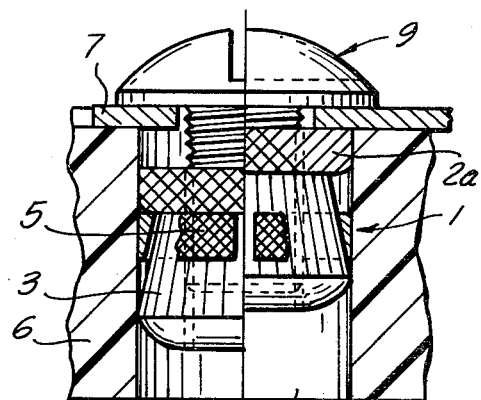
FIG. 3
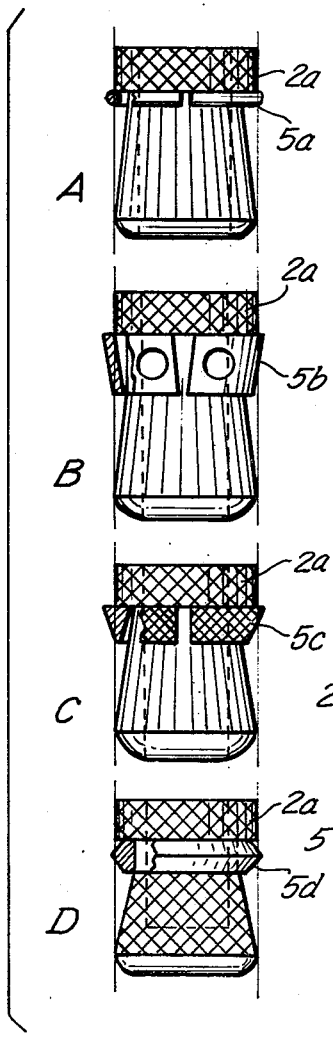
FIG. 2
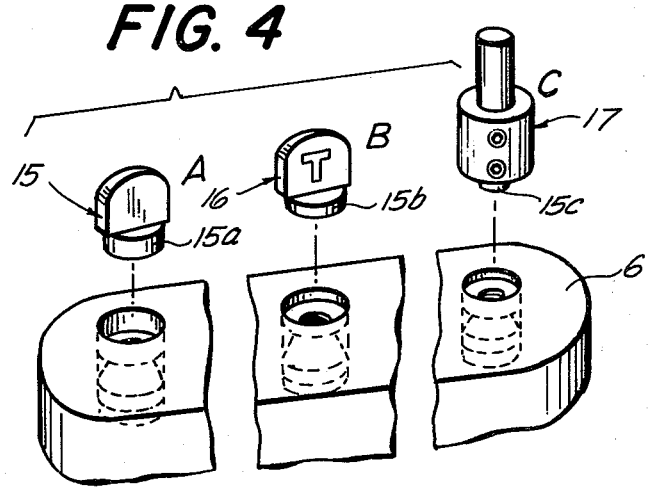
FIG. 4
FIG. 5
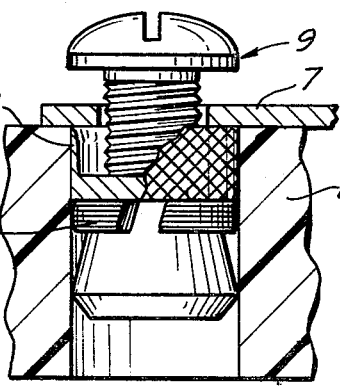
FIG. 6
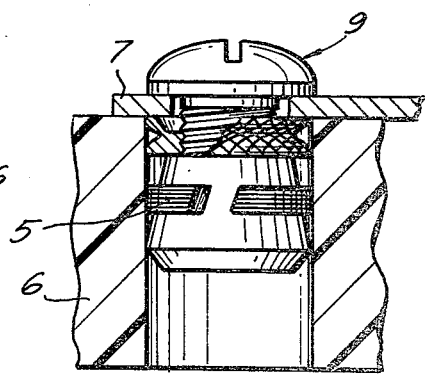
FIG. 7

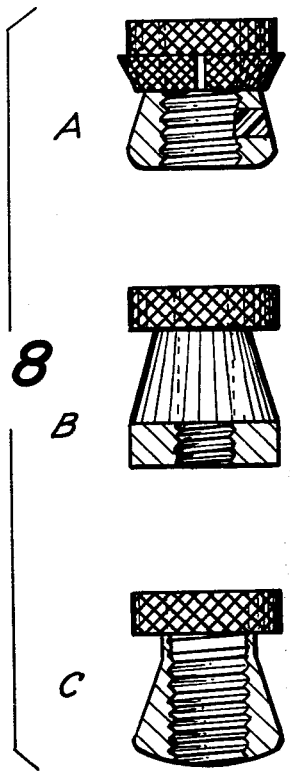
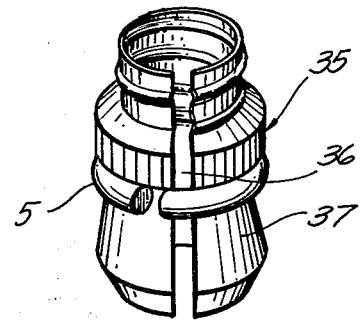
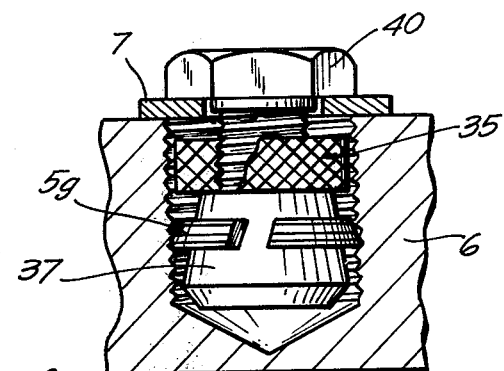
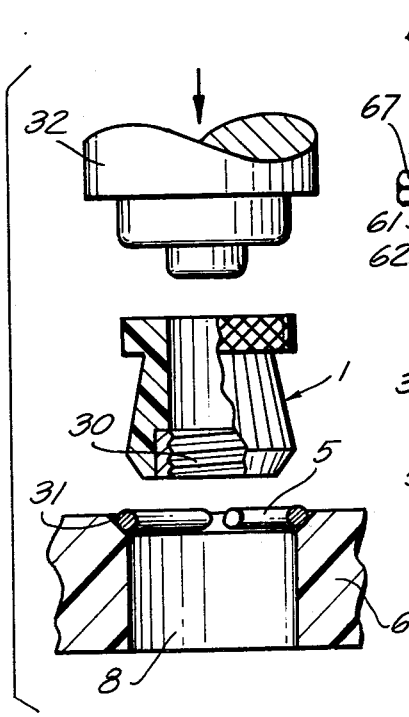
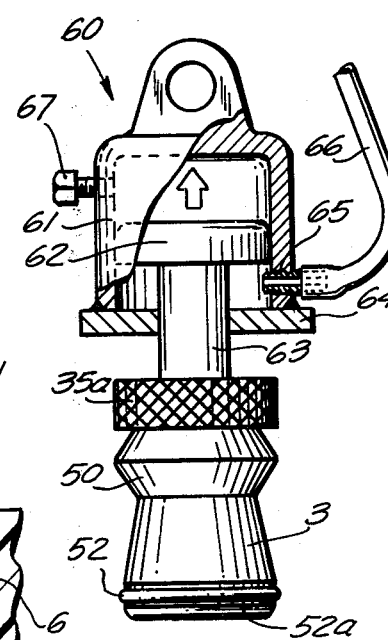
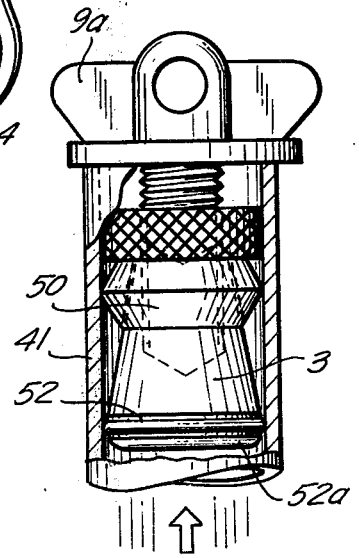
FIG. 8
FIG. 10
FIG. 11
FIG. 9
FIG. 12A
FIG. 12

FASTENING DEVICE FOR LOCKING AN INSERT IN A HOLE OF A SUPPORT MEMBER

The present invention relates to a device for attaching two members to each other, and more particularly, to a device for fastening a structural member such as a panel or other component such as carrier to a support member including a receiving hole.

BACKGROUND

A frequent application for insert-type fastening devices generally known as "Thread-Inserts" is the utilization of holes in the corner or side fillets or projecting mounting studs of molded or die-cast boxes or containers to which a lid or panel or a component part is to be affixed. This is the most common way of mounting and assembling appliances and instruments. The use of such thread inserts is very widespread in industrial production. Therefore, cost of the inserts and economy of insertion are of considerable importance. For example, the obvious methods of drilling and tapping the fillets or insert-molding thread bushings into the case, are by far too slow and expensive. They are hardly used nowadays in production.

According to the state of the art now known, thread inserts are commonly small metal bushings with an inside thread and a rough outside; generally, the bushings are knurled or grooved, or have sharp undercuts. They are frequently slotted in axial directions, so that the inserted screw may produce a slight expansion, or they may rely for anchoring on a springy circumferential component which has to be compressed for insertion and bears frictionally against the hole wall. It is characteristic of most known types of thread inserts that they must be force-fitted into the holes in the container or mounting base. This force-fitting characteristic applied also to those types of known thread inserts which have on their outside a coarse self-cutting thread so that they can be forcibly screwed into the holes in the mounting base. As a result, it occurs not infrequently that the force of the insertion cracks the plastic or die-cast mounting base, or sets up tensions and stresses which later result in cracks. If the insertion is less forcible, the insert may remain loose or may be subsequently loosened by vibration or may turn when a screw is inserted and tightened. The different expansion coefficients of the metal bushing and the surrounding plastic or die-cast material may also lead to loosening at a later date, especially under the influence of vibration.

In order to overcome the problems caused by forcible insertion of thread inserts, ultrasonic or spot-heating devices are used to insert the bushing into the hole without the use of force, by locally plasticizing or re-heating the material surrounding the bushing. Spot-heating devices are restricted to use on thermoplastic materials. They are comparatively slow to operate, and they are not always fully reliable in use if there is a variation in conditions (tolerance of the bushing diameter or of the hole diameter, or of the chemical composition of the plastic).

Another known type of the thread insert which does not require forcible installation, consists of a coil of wire of lozenge-shaped cross-section. This wire coil is screwed into a hole in the mounting base which has previously been tapped. It offers advantages through the elasticity of the wire coil which forms the screw thread but is obviously not used for the same purpose nor is it economically competitive with inserts whose principal purpose is to save the tapping operation.

THE INVENTION

It is a broad object of the invention to provide a novel and improved fastening device for fastening a structure to a support member including a mounting hole, by "push-fitting" an insert into the mounting hole and then screwing a screw into the threaded insert hole thereby automatically tightening and locking the insert in the mounting hole and simultaneously securing a lid or other structure to the support member. "Push-fitting" is herein defined as sufficient to hold the insert lightly and temporarily in place pending the tightening of the screw, as opposed to "force-fitting" which furnishes all or most of the anchorage for the insert.

Another object of the invention is to provide a novel and improved fastening device in which a locking ring initially positioned and shaped to permit insertion of the insert of the fastening device into the mounting hole of the support member is automatically changed into a position and shape causing locking of the insert within the mounting hole upon tightening a screw for fastening a structure to the support member.

A more specific object of the invention is to provide a novel and improved fastening device including means facilitating insertion of the insert into the mounting hole to a depth permitting precise control of the expansion force exercised by the insert against the wall of the mounting hole in the support member upon tightening of the mounting screw.

Another specific object of the invention is to provide a novel and improved fastening device including means to strengthen the locking of the screw inside the insert (vibration-proofing) by collapsing, through pressure against the panel or other component secured by the screw, part of the bushing upon lifting of the insert in response to tightening of the screw and pressing said collapsed part against and in-between the threads of the screw.

Another more specific object of the invention is to provide a novel and improved fastening device including a compressible member by which the thread insert is sealed to the screw and the wall of the mounting hole, upon lifting of the insert in response to tightening of the screw.

A further specific object of the invention is to provide a novel and improved fastening device which will enable a screw to be fitted instantaneously to a threaded hole in any type of rigid material the thread of which has been worn out or damaged.

Another specific object of the invention is to provide a quick-acting closure for pipes carrying liquids or gases under pressure.

SUMMARY OF THE INVENTION

The afore-pointed out objects, features and advantages, and other objects, features and advantages which will be pointed out hereinafter and are set forth in the appended claims are obtained by providing an insert member insertable into a cylindrical receiving hole in the support member to which a panel or other part is to be fastened. This insert member comprises a bushing portion of circular outline which fits the diameter of the receiving hole with light friction which may be obtained by roughening or knurling the outside surface of the cylindrical portion of the bushing. A conical portion is secured with its narrow end to the collar portion of the bushing or is integral therewith. The cone is coaxial with the bushing and its outer maximal width fits the diameter of the receiving hole. A locking ring or band made of a resilient and bendable material such as, for instance, steel, iron, copper, brass, or synthetic plastics material, for instance polyethylene or polyvinyl chloride, is fitted upon the cone. It has an inner diameter such that it is loosely retained in a position on the cone adjacent to the collar of the bushing. Its outer diameter is slightly larger than that of the receiving hole so that the locking ring is slightly compressed by insertion of the device into the receiving hole. The loose fit of the ring and the gap in its circumference afford enough clearance for the ring to be thus compressed.

It is also possible to use for the locking ring a non-resilient but deformable material such as a lead or a die-casting alloy or even rubber. In this instance, the locking ring need not be split and need not be fitted loosely as described above because it is slightly squeezed and deformed during insertion into the mounting hole. Once inserted both types of locking rings perform identically. This type of insert is especially useful for inserts which are used to pressure-seal liquids and gases.

A threaded hole extends, partly or entirely, through the axis of the insert to receive a screw.

To secure a part such as a panel to a support member such as a box having mounting holes, the insert is pushed, with the conical portion first, into one hole, slightly below the level of its edge. The aforedescribed correlation of the outer dimension of the bushing, the reversed cone, and the ring with the diameter of the mounting hole permits such insertion without difficulty either manually or by automated equipment, but provides sufficient friction between the hole wall and the locking ring and between the hole wall and the bushing, respectively, to hold the insert axially in place and to thread the screw into the insert without free turning of the insert.

The panel is placed upon the box with a suitable hole in the panel in registry with the threaded hole in the insert and the screw is now screwed through the panel into the insert. As the screw is tightened, it automatically lifts the entire insert relative to the mounting hole in the box and relative to the locking ring. Such lifting forces the conical part of the bushing deeper into the locking ring. As a result, the locking ring is expanded and its outside is pressed with increasing force against the wall of the mounting hole thereby locking the insert within the mounting hole and thus fastening the panel safely to the box.

The inserts according to the invention will operate equally well in a smooth-walled hole or in a hole which has previously been threaded. The configuration or the state of preservation of the thread is quite immaterial.

Thread inserts according to the invention can be used repeatedly. When the screw is removed, the above-described friction between bushing, locking ring and hole wall will hold the insert in place. An insert can be removed, if desired, by pushing it downwards into the hole whereby the cone section of the bushing ceases to expand the locking ring and thereby loosens the anchorage of the insert.

The inserts according to the invention can be supplied to the user in pre-assembled form with the locking ring in position as described, or in two separate parts which are assembled automatically during the process of inserting the fastener into its mounting hole.

The slight lifting movement of the insert during the tightening of the screw which has been described above, is a very essential part of the invention, and so is its utilization for the purpose of controlling and limiting the expansion force exercised by the insert against the wall of the mounting hole. The aforesaid lifting movement is further utilized for collapsing a vibration-proofing collar against the tightened screw, or of pressure-sealing the insert.

Likewise typical is the fact that the anchoring force of the insert is essentially represented by compression of the locking ring or band. This anchoring force is applied uniformly and evenly in a (near) circle, and it increases proportionately to the fastening torque applied by the screw, or to a removal force applied to the fastened panel or component. The last-mentioned feature constitutes the "automatic servo-action of the reversed-cone lock" and is so potent that means for its control are advisable when the insert is used in thin-walled material. Control of the tightening torque is provided automatically by regulating the insertion depth of the bushing.

BRIEF DESCRIPTION OF THE DRAWING FIGURES

In the accompanying drawing, several embodiments of the invention are shown by way of illustration and not by way of limitation.

IN THE DRAWINGS

FIG. 1 is a divided elevational view, partly in section, of a fastening device or insert according to the invention, the left half showing the insert after insertion into a plastic body and the right-half after tightening of the screw;

FIGS. 2A to D show elevational views of five types of inserts and locking rings according to the invention;

FIG. 3 is a divided elevational view, partly in section, corresponding to FIG. 1 in which the insert according to the invention has been inserted to a lesser depth than in FIG. 1;

FIGS. 4A, B and C are perspective views of three different punches or gauges used for effecting and checking the insertion to a precisely controlled depth of three inserts shown inserted into plastic bodies;

FIG. 5 is an elevational view, partly in section, of a modified insert according to the invention with an integral collapsible cup;

FIG. 6 is an elevational partly sectional view of a modified insert according to FIG. 5, inserted into a bore in a plastic body;

FIG. 7 is an elevational partly sectional view of the fastening device according to FIG. 6, locked in the bore in a plastic body and simultaneously locking the tightened screw against involuntary displacement;

FIGS. 8A, B and C show three elevational partly sectional and partly perspective views of inserts according to the invention provided with different means for securing the screw against involuntary displacement;

FIG. 9 is an elevational partly sectional exploded view of a further modification of the insert according to the invention, and of a tool for pushing the insert bushing into the bore in a plastic body and simultaneously completing assembly of the insert;

FIG. 10 is a perspective elevational view of another modification of the insert according to the invention, formed from a sheet metal blank;

FIG. 11 is an elevational partly sectional view of an insert according to the invention, locked in a threaded bore in a metal body;

FIG. 12 is an elevational partly sectional view of a further modification of the insert according to the invention, intended to close and cap the opening of a pipe carrying liquid or gas under pressure; and FIGS. 12A is an elevational view, partly in section, of a modification of FIG. 12.

DETAILED DESCRIPTION OF THE DRAWING FIGURES

Referring now to the drawing figures more in detail, and first to FIG. 1, the left half of this figure shows an embodiment of the insert according to the invention inserted into a suitably dimensioned bore in a body made of form-retaining material, such as synthetic plastic material or metal. The insert is pushed into the bore without the use of force. Contrary to other inserts of this type, it locks when the screw is tightened, and its locking strength increases in proportion to the applied load.

More specifically the insert according to FIG. 1 comprises a bushing 1 made for instance of metal or a hard synthetic plastics material. The inside of the bushing is threaded with a female thread 2 and the outside at its largest diameter, hereinafter called collar 2a, is preferably roughened for instance by grooves or knurls. A cone 3 extends from one side of the collar facing the same with its narrow end. The wide end of the cone has preferably an inwardly tapered portion 4 to facilitate insertion of the bushing into a hole. The insert further comprises a split locking ring 5. The ring is made of metal, and its dimensions and hardness are selected in correlation with the dimensions of the cone and the inner peripheral outline of the bore and its material as will be hereinafter explained with reference to FIG. 1. The ring may have a triangular cross-section as is shown in FIG. 1. Ring 5 may have a round, rectangular or similar cross-section and be grooved to roughen its outer surface.

FIG. 1, shows a portion of a body, such as a box 6, made of synthetic plastics material or other suitable material to which a part such as a lid or panel 7 is to be fastened by means of one or several inserts as above described. To effect such fastening of the panel, bores 8 are provided in the sidewalls of box 6, or in corner or sidewall fillets or in studs which form part of the box. The diameter of each bore is such that it just fits the outer diameter of the collar part 2a of the bushing 1.

The insert is then pushed into the bore to such a depth that the top level of the bushing is somewhat below the top surface of box 6. The insert is held in its position in the bore by knurled collar 2a and by locking ring 5 which is slightly compressed during insertion of the insert.

Fastening of the panel is effected by inserting screw bolts 9 through the panel and screwing them into the bushings. The knurled or otherwise roughened collar 2a of the bushing provides friction between the bushing and the wall of the bore 8 sufficient to permit the initial screwing-in of screws 9 without spinning or idling of the insert. The now expanding locking ring 5 holds the insert in its depth position in the bore. This preliminary stage of holding the insert in bore 8, securing it against spinning and against depth displacement, and fastening the panel, is shown in the left half of FIG. 1.

Referring now to the right half of FIG. 1, this figure shows screw bolt 9 fully screwed in, thereby locking the insert within the bore and pressing the panel against the box.

According to the invention, continued screwing-in of the screw automatically effects tightening of the insert in the bore. As is shown on the left side of FIG. 1, initially locking ring 5 is located at or close to the narrow end of the cone and is slightly compressed during the insertion of the insert. As the screw is being screwed in, the bushing is pulled towards the head of the screw. As the locking ring 5 is held stationary by its friction against the bore wall, it expands more and more as it is wedged open by an increasingly wider portion of the cone. As the insert moves upwards, the ring is squeezed stronger and stronger between bore wall and bushing. This locking action is hereinafter referred to as "Reversed Cone Lock". It is typical for this locking action that the locking strength of the insert increases proportional to the applied screw pressure.

The right half of FIG. 1 shows the screw fully screwed-in, it also shows the locking ring in its locking position and the entire insert lifted upwards relative to the position shown in the left half of FIG. 1. The division of FIG. 1 in two halves shows clearly the relative movement of the various components which coact in the locking action.

FIGS. 2A to 2D show five different types of locking rings and several types of cones. This enumeration is not exhaustive but will serve to illustrate the design principles guiding the choice of the locking ring 5a and the cone. Type A is a split ring made from wire, as it is loosely fitted on the cone just below the collar 2a, and as it projects slightly from the profile of the collar, it is compressed as soon as the insert is pushed into the bore the diameter of which is indicated by two parallel lines. This type of locking ring is inexpensive to manufacture. It makes contact with the cone surface only along the narrow line of its inner diameter, and this friction may not always be enough to anchor the ring securely against the pull of the upwards-moving bushing.

FIG. 2B shows a locking ring 5a made from thin wire, coacting with a longer cone. This increases friction but makes the fastener more dependent on the tolerance of the bore into which it is to be inserted. If there is too much clearance or if the base material is too soft, the locking ring may pull out under load.

FIG. 2B shows a locking ring 5 made from sheet metal which has a number of sharp-edged punched holes which increase friction.

FIG. 2D shows a locking ring 5d made from wire with wedge-shaped cross-section the outside of which is preferably roughened. The projecting upper edge of the ring presses sharply against the wall of the bore when the fastener is inserted. When the ring is compressed its triangular cross-section conforms essentially with the shape of the cavity between cone and hole wall into which the locking ring is wedged. The embodiments shown in FIGS. 2D and 2C are the locking rings for all-round performance in different materials, combined with short overall length of the cone part of the bushing.

FIG. 2C shows a locking ring 5C which has no gap and is not loosely but tightly fitted around the root of the cone. It has a preferably triangular cross-section, with the apex projecting over the diameter of the bore. This locking ring is made from lead or die-casting metal or even from rubber or plastic and is capable of being deformed by pressure. When ring 5C is inserted into a hole with some degree of force, the projecting apex line of the ring is flattened and bears frictionally against the hole wall. The deformation of the ring material permits it to act in like manner as the split locking rings described above. It also has the effect of wedging the pliable lead tightly between cone and hole wall, and as there is no gap in the ring, establishing a seal capable of withstanding high pressure of liquids or gases. If the insert is used for this purpose, its axial bore does not extend for the full length of the bushing.

FIG. 2D also shows roughening of the cone portion of the bushing by knurling or otherwise impressing a pattern upon the cone. This increases the friction between cone and locking ring 5d.

All locking rings shown in FIGS. 2A through FIG. 2D have in common that their diameter at the lower edge is slightly smaller than the diameter of the hole and permits initial entry of the insert into the hole, and that on continuing insertion the ring is compressed inside the hole and bears frictionally against the hole wall.

The selection and design of a suitable type of cone and locking ring is a matter of balancing the axial pull of the screw 9 against the friction exercised by the locking ring against the hole wall. If these two factors are not correctly balanced, having regard to the material, and the diameter tolerances of the bore as well as to the angle, surface and length of the cone, the locking ring will not remain stationary as shown in FIG. 1, but will move upwards. Incorrectly balanced fasteners will hold a panel by simple friction in the holes but will fail to develop the "Reversed Cone Lock" action which is the essence of the fastening devices according to this invention.

The initial placement of the insert below the level of the box is essential for the functioning of the insert. There is no fixed maximal depth but the minimal depth should be so that the insert on its upward travel does not yet touch the panel. FIG. 1 shows both positions of the insert. If inserted in this manner that is to say with excess space for upwards travel, the insert is able to develop its full locking strength which increases in proportion to the torque applied by means of the screw or to the tensile pull applied to the fastened panel. This vast reservoir of locking strength is desirable in some applications such as for instance when the insert is embedded in metal. However, if the insert is to be embedded in a thin-walled section of plastic material such as a stud or fillet, the expansion and locking capacity of the insert may result in cracking the plastic. This can be avoided by limiting the torque of the screws holding a panel, by means of a torque screwdriver. Such screwdrivers are readily available for the production assembly of a manufactured unit but will not always be at hand when an installed panel is removed for access and subsequently refastened.

However, the insert has its own built-in means for limiting torque and expansion during the installation. This is achieved by controlling the insertion depth of the insert in such a manner that the collar 2a touches the panel 7 when the desired maximum expansion of the locking ring is reached. As soon as the insert collar touches the panel, all expansion action stops. This relation of the insertion depth to the limitation of expansion is clearly shown in both halves of FIG. 3 which shows the insert of FIG. 1 in its locking position.

FIGS. 4A, 4B and 4C shows some practical means according to the invention to control the insertion depth of inserts embedded in holes in a plastic body 6 as described hereinbefore. There is shown in each of the three Figures a shaped handle 15, 16 and 17 respectively which abuts against the edge of the respective hole when a plug 15a, 15b and 15c respectively pushes the insert down into the bore.

The handle of FIG. 4A pushes the insert deep enough for unlimited tightening torque and expansion.

The handle of FIG. 4B limits the insert to optimal torque and expansion without danger of cracking the plastic. Both tools are inexpensive plastic moldings which can be used as tools for hand inserted inserts or as gauges.

FIG. 4C shows a tool suitable for production runs in which the insertion depth and thereby the tightening torque is precisely adjustable to any desired level.

As it is now apparent, the insert according to the invention has therefore integral means for regulating the force which it can apply. This feature makes it an infinitely more sophisticated device than any other thread insert, in that it can be regulated by very simple and not time-consuming means to exercise precisely the degree of force which is desired. This feature makes the insert according to the invention especially suitable for use in delicate structures which are becoming increasingly important in industry through the spread of miniaturization.

The slight upward movement of the bushing inside the hole which is described above as typical of the reversed-cone locking action, is therefore an advantage of this insert as compared with other thread inserts which are immovable after insertion. In the following, other embodiments of the invention are shown which make practical use of the "reversed-cone" upwards movement of the bushing.

The inserts shown in FIGS. 5, 6 and 7 are based upon the same principle as the inserts shown in FIGS. 1 to 3, but the bushing is modified. As best shown in FIG. 5, the brass bushing is provided with a collar section 2a which is cup-shaped and has side walls 2b which are thin enough to be collapsed by axial pressure as is generated by tightening screw 9. The height of the sidewall 2b of the cup-shaped collar 2a above its base is advantageously such that when the insert is fitted into the bore 8 with the upper edge of the sidewall flush with the top of the box 6, the depth of insertion is essentially the one required to lock the insert in the box as previously described. Cup or collar 2a therefore serves in the first place as a spacing collar; if the insert is inserted flush.

FIG. 6 shows that the insert fitted into the bore and ready for tightening screw 9 and FIG. 7 shows the screw 9 tightened to fasten the panel to the box. In tightening the screw, the cup-shaped spacing collar 2a had to be collapsed before tightening of the screw could be effected. Simultaneously, the bushing had been lifted enough to lock the insert inside the bore. FIG. 7 shows that the cup-shaped collar 2a formed by the thin side wall 2b of the bushing has inwardly collapsed in such a manner that it presses at least partly against and between the threads of screw 9. The collapsed collar thus prevents displacement of the screw and thereby also of the insert, and it makes this type of insert essentially vibration and shock-proof. Instead of using a special bushing with integral cup, a standard bushing of any of the types shown in FIG. 2A through 2D may be used.

Reverting to FIG. 5, this figure shows a further embodiment of the inventive concept in which the slight upward movement of the locking action is utilized for a special purpose. The insert itself is essentially the same as any of those shown in FIG. 7 and also functions in the same manner. However, after the insert has been fitted into bore 8 of box 6, a sealing ring or washer 5 is inserted into the space provided in the cup-shaped collar before the panel and the screw are applied. The height of ring seal 5 is such that it is flush with the top level of box 6 or slightly below. There is shown a ring seal 20 which is made of pliable, elastic material such as rubber or a synthetic plastics material, for instance neoprene. As it is evident and previously explained, tightening of the screw pulls the bushing upwards and thereby reduces the space available for ring seal 20, whereby the ring is deformed as to height. As a result, the compressed ring will seal the bushing to the bore wall and also penetrate between the threads on the bushing and the screw thereby sealing the screw to the bushing. Such sealed fastening is highly useful for many purposes in addition to those mentioned herein. Instead of a deformable ring seal 20 a collapsible ring seal 20a may be used. Such ring functions similar to the collapsible collar as described in connection with FIGS. 6 and 7.

FIGS. 8A, 8B and 8C show other modifications of the insert according to the invention which will serve to make the insert vibration-proof.

FIG. 8A shows a plastic plug 8a pressed into a cross hole 8b in the bushing which presses on the thread of the inserted screw.

FIG. 8B shows a locknut 50 of any type attached to or forming part of the bushing. Both the structures illustrated in FIGS. 8B and 8C are well known and conventional.

In FIG. 8C another structure is shown which again utilizes the typical movement upwards of the insert bushing. In drilling and tapping the axial hole in the insert shown in FIG. 8C, the section of thread in the "neck" of the bottle is drilled out so that only traces of a thread are left. This weakens the structure of the bushing at its narrowest section, with the result that when the screw 9 is tightened, this section collapses and presses against the screw, thus securing it.

The embodiment according to FIG. 9 shows a very economical type of bushing, made of a suitable metal or hard synthetic plastics material, into the bottom of which a nut or locknut 30 has been pressed. This composite unit replaces the machined and internally threaded bushing shown in all previously described Figures. The locking ring 5 is not initially fitted upon the cone but in an annular cut-out at the rim of box hole 8. A manually or automatically operated tool 32 such as a punch serves to insert the insert into the hole and simultaneously slipping the ring upon the cone. The tightening of the insert is as previously described. A cylindrical protrusion 32a controls the depth of insertion.

FIG. 10 shows an embodiment of the invention which is particularly designed for large size inserts and for coaction with screws which have a coarse thread, such as self-cutting screws. The insert of FIG. 10 is essentially a stamped and rolled replica of the insert of FIGS. 1 and 3. There is shown a bushing 35 made of suitable metal into which coarse female threads 36 are pressed, and the blank is then rolled. The reversed cone 37 and its action are the same as previously described. The split ring 5 is also as previously described.

FIG. 10 shows an assembly mode which can be applied to all embodiments of the invention, except FIG. 2D. Instead of furnishing the fastener assembled with the locking ring attached to its cone, it can be furnished in two separate parts so that the locking ring 5 is assembled by the user as part of the process of inserting the fastener.

This mode is essentially suited for quantity production in which the components are fed, placed in position, and inserted by automatic means. However, the assembly mode hereinafter explained can also be used to advantage for assembly by means of a small insertion press, or even without any tools other than a hammer and punch 32 shown in FIG. 9.

The split locking ring 5 is placed over bore 8 in the plastic box 6. Precise location may be assisted by a cut-out or countersink 31 at the top of the bore which, however, is not essential to the functioning of the device. The front part 4 of any embodiment of the fastener is then placed inside locking ring 5, and a tool such as a punch 32 is applied to the fastener bushing. As it presses down, the split locking ring or band 5 is expanded until it permits passage of the front part of the bushing. Next, the collar of the bushing presses locking ring 5 into the bore where it expands and presses against the wall of the bore. The punch presses the bushing deeper into the bore. When the step or protrusion 32a of the punch prevents further downward movement, the fastener has been inserted to the correct depth inside the bore. Now the screw 9 can be inserted and the fastener tightened as described with reference to FIGS. 3, 6 and 9. By these means, the manufacturer can save the sub-assembly of the locking ring without increasing the installation costs of the user. The sequence of automatic assembly and insertion as described in connection with FIG. 9 can be applied to the embodiments described previously. It is essentially a question of economy and specific requirements.

FIG. 11 shows an embodiment of the invention specifically intended to fasten a screw in a threaded bore in which the thread has been stripped or otherwise become faulty. The normal mode of repairing a stripped thread is time-consuming and consists in drilling out and re-threading the bore to take a larger screw, or alternatively drilling out, tapping and fitting an insert with inside and outside threads in form of a machined bushing, or of a spirally-wound coil of thread-section wire. Any insert according to the invention will function not only in a smooth bore as previously described but will lock just as securely in a threaded bore, regardless of the state of the thread and will afford great advantages in making a speedy repair of a stripped thread.

In FIG. 11, an insert of the type of FIG. 1 is shown by way of example. The locking ring is preferably a grooved band 5g, but any of the locking rings shown in FIGS. 2A through 2D can be used. The screw for locking the insert in the bore is shown as a hexagon headed screw 33, by way of example.

FIG. 12 is constructionally a thread insert, but it is also highly capable of acting as a closure for pipes which utilizes all features of the inserts according to the invention.

It has been explained above with reference to FIG. 2D that the insert if modified as shown in FIG. 2D can serve to seal an opening against gas or liquids under pressures. The same modifications are embodied in FIG. 12, viz, the axial bore does not go through, and the lock ring 50 is made of a yielding material such as lead or a yieldable plastic, for instance, neeoprene, and does not require a gap or clearance against the cone root.

The fastener is shown to be inserted into a pipe 41, to a depth which is sufficient to allow the full force of the reverse-cone action to be applied. As expansion proceeds through the turning of screw 9a, the lead ring is wedged tighter and tighter between the cone 3 and the pipe wall, thus sealing the pipe. Pressure in the pipe 41 bears against the flat bottom surface of the cone which means that pressure serves to reinforce and strengthen the sealing action by pressing the bushing upwards. It is in effect a closure with servo action which seals tighter in proportion to the pressure which it sustains.

The closure thus obtained can be applied to pipes and pressures of all sizes and magnitudes. This includes the capping of broken oil lines under pressure, recognized to be one of the most difficult tasks in oil well operations. For this purpose, the bushing may be fitted optionally with a plastic O ring 52 which is seated in a groove 52a in the conical portion as shown in FIG. 12, or else with a metal piston-ring which is similarly installed in a groove. This serves temporarily to diminish the pressure below the bushing collar during insertion. As soon as the insert begins to "grip" and to expand the lead locking ring, the pressure against its bottom section takes over and completes the sealing action with great force. The direction in this operation is identical with that imparted by the screw, and both are indicated by an arrow in FIG. 12.

The fastener according to the invention can serve conveniently to pick up and temporarily hold pipes from a crane or derrick.

The insert is locked as previously described, that is, the fastener is inserted into the open end of the pipe and is secured by turning the screw and thus expanding the locking ring.

FIG. 12A is a modification of FIG. 12. While in FIG. 12 a screw is used for tightening of the insert in pipe 41 by lifting the insert as previously described, the embodiment of FIG. 12A uses other tightening means to achieve the same result. More specifically, the fastener device of FIG. 12A uses a hydraulic unit 60 for this purpose. This unit comprises a cylinder 61 in which is slidable a piston 62. The piston is secured to a rod 63 which, in turn, is secured to or integral with a collar 35a. The rod is slidable in a cloche 64 which supports the cylinder and is welded or otherwise fixedly secured to the rim of pipe 41 (see FIG. 12) or other tubular member to be sealed and/or supported. The upward displacement of the piston is effected in a substantially conventional manner by a nipple 65 communicating with the space within cylinder 61 below piston 62 and connected to a hydraulic line 66. A second nipple 67 is provided in communication with the upper portion of the space in the cylinder. This nipple is normally capped and serves to release the hydraulic pressure.

As it is apparent, pressurizing the cylinder space below the piston will cause lifting of the piston and, thus, lifting of the insert proper until bushing portion 35a is pressed against the bottom side of the cloche thereby sealing the pipe.

The operation of the fastener according to FIG. 12A will be obvious from the previous description and is very similar to the one described in connection with FIG. 12. The insert is inserted into the open end of a pipe or other tubular member and the hydraulic unit is then activated as described.

Other tightening means may be provided, such as vacuum systems, hooks engageable with cut-outs in the hole within the insert, etc.

As it is evident, tightening means of the type described in connection with FIG. 12A may also be used in the previously described embodiments showing the use of a screw to be tightened for effecting lifting and thus locking of the insert.

While the invention has been described in detail with respect to certain now preferred examples and embodiments of the invention, it will be understood by those skilled in the art, after understanding the invention, that various changes and modifications may be made without departing from the spirit and scope of the invention. Accordingly, it is intended therefore, to cover all such changes and modifications in the appended claims.

I claim:

1. A fastening device for locking in a tubular hole in a support member, said fastening device comprising:
    an insert member including a bushing portion having a peripheral outline fitting the peripheral outline of said hole and a conical portion of uniform conicity extending from one side of said bushing portion coaxially therewith, the narrow end of said conical portion being adjacent to the bushing portion and the maximal peripheral outline of the wide end of said conical portion also fitting the hole in said support member, said insert member having a hole extending through at least part of said insert member coaxial with the center axis thereof, said bushing portion having an outer surface with means thereon for frictionally holding said insert member in said hole;
    a diametrically deformable locking ring having an outer peripheral outline engageable with the wall of the hole in said support member, means providing a tight-fitting relationship between said ring and the wall of said hole to oppose displacement and rotation of said ring, said ring being seated upon said conical portion and having a width representing only a minor portion of the length of the conical portion of the insert member; and
    tightening means fitted in the hole in the insert member and being engageable with the wall of said hole to effect lifting of the insert member relative to the hole in the support member, said lifting of the insert member placing the ring in a position closer to the wide end of said conical portion thereby causing pressing of the ring against the hole wall in the support member thus locking the insert member within the hole of said support member.

2. The fastening device according to claim 1 wherein said tightening means comprise a screw and said hole in the insert member has a threaded wall fitting the screw threads, whereby tightening of the screw in said hole causes lifting of the insert member relative to the support member.

3. The fastening device according to claim 2 and comprising a structural member having a hole fitting said screw, extending of the screw through said hole and tightening of the screw securing said structural member to the support member.

4. The fastening device according to claim 1 wherein said locking ring is a split ring capable of diametrically expanding in response to the lifting of the insert member.

5. The fastening device according to claim 4 wherein said split locking ring is made of a bendable wire.

6. The fastening device according to claim 4 wherein said split ring has on its outer side a substantially flat slanted surface.

7. The fastening device according to claim 4 wherein said locking ring has a generally triangular cross-section, the apex of said triangular cross section facing outwardly.

8. The fastening device claim 4 wherein the outwardly facing side of said locking ring is roughened.

9. The fastening device according to claim 4 wherein said locking ring includes circumferentially spaced holes.

10. The fastening device according to claim 1 wherein said ring is made of a pliable material.

11. The fastening device according to claim 10 wherein said ring is made of lead.

12. The fastening device according to claim 1 wherein said bushing portion of the insert member has on its side opposite to the conical portion a tubular cup-shaped extension of a height approximately equal to the lifting of the insert member upon tightening of said tightening means, said extension being arranged to collapse within said hole in response to the axial pressure acting upon it upon lifting of the insert member thereby limiting upward movement of the insert member and sealing the tightening means to the insert member.

13. The fastening device according to claim 1 wherein said bushing portion of the insert member has on its side opposite to the conical portion a tubular cup-shaped extension of a height approximately equal to the lifting of the insert member upon tightening of said tightening means, and comprising a pliable tubular member inserted into the inner cross-sectional area of said extension and providing passage for said tightening means, said pliable member being deformed upon tightening of the tightening means so as to seal said tightening means to the bushing portion of the insert member.

14. The fastening device according to claim 1 wherein said insert member is a one-piece member made of a synthetic plastics material.

15. The fastening device according to claim 1 wherein said tightening means is a screw, and wherein a threaded nut is secured within the hole in the insert member adjacent to the wide end of the conical portion, the remaining length of said hole being smooth, the threads of said nut being arranged to receive said screw.

16. The fastening device according to claim 1 wherein said support member is a box open on one side, the rim of the box at the open side including said hole for receiving said insert member, and comprising a closure member including an opening for passage of said tightening means to secure the closure member to the box upon tightening said tightening means.

17. The fastening device according to claim 1 wherein said support member comprises an elongated tubular member, the inner peripheral outline of said tubular member fitting the outer peripheral outlines of the bushing portion and the conical portion of said insert member.

18. The fastening device according to claim 17 and comprising a closure member for capping an end of said tubular member, activating of said tightening means lifting said insert into its locking position and pressing said closure member against the rim of the tubular member at the respective end thereof.

19. The fastening device according to claim 18 wherein said locking ring is a ring made of a pliable material.

20. The fastening device according to claim 18 wherein said conical portion of the insert member has a circular groove, and an O-ring is fitted in said groove.

21. The fastening device according to claim 1 and comprising a ring member made of a pliable material, said member having an outer diameter fitting the hole in the support member and an inner diameter providing passage for said tightening means, the height of said ring member being such that upon insertion of the ring member into the hole of the support and on the top side of said bushing, the ring member is deformed upon and due to lifting of the insert member so as to seal the hole in the support member above the insert member.

22. The fastening device according to claim 1 and comprising a ring member, said ring member having an outer diameter fitting the diameter of the hole in the support member and having a wall thickness arranged to be deformed in response to axial pressure applied thereto by lifting of the insert member upon tightening of the tightening means, the height of said ring member being such that upon insertion of the ring member into the hole of the support member and on top of said bushing whereby upon lifting of the bushing, said ring member wall is deformed inwardly so as to press firmly against the tightening means.

23. The fastening device according to claim 1 wherein said insert member includes an inwardly tapered portion extending directly from said wide end of the conical portion thereby forming an angulated ridge at the junction thereof.

24. The fastening device according to claim 1 wherein said support member has a countersink, said locking ring initially being on said countersink, means being provided for inserting said insert member through said locking ring and into said hole and transporting said locking ring therewith to a specific depth with said hole.

25. A device for locking an insert in a tubular member, said device comprising:
an insert member including a bushing portion having a peripheral outline fitting the inner peripheral outline of said tubular member and a conical portion of uniform conicity extending from one side of said bushing portion coaxially therewith, the narrow end of said conical portion being adjacent to the bushing portion and the maximal peripheral outline of the wide end of said conical portion also fitting the inner peripheral outline in said tubular member, said bushing portion having an outer surface with means thereon for frictionally holding said insert member in said tubular member;
a diametrically deformable locking ring having an outer peripheral outline engageable with the wall of said tubular member, means providing a tight-fitting relationship between said ring and the wall of said tubular member to oppose displacement and rotation of said ring, said ring being seated upon said conical portion and having a width representing only a minor portion of the length of the conical portion of the insert member; and
tightening means secured to said bushing portion coaxial therewith, said tightening means including lifting means operable for lifting said insert member relative to the tubular member thereby locking the same within the tubular member.

26. The device according to claim 25 and comprising closure means supported by the lifting means and disposed to be pressed against the respective end of the tubular member upon lifting said insert member into its locking position thereby sealing the tubular member at said end.

27. The device according to claim 25 wherein said lifting means are hydraulic means.

* * * * *